United States Patent

[11] 3,598,984

| [72] | Inventor | Stanley L. Slomski Lyndhurst, Ohio |
|---|---|---|
| [21] | Appl. No. | 784,074 |
| [22] | Filed | Dec. 16, 1968 |
| [45] | Patented | Aug. 10, 1971 |
| [73] | Assignee | General Electric Company |

[54] PHOTOFLASH LAMP ARRAY
10 Claims, 5 Drawing Figs.

[52] U.S. Cl.................................................. 240/1.3,
240/37.1, 95/11 L
[51] Int. Cl................................................ G03b 15/02
[50] Field of Search........................................ 240/1.3,
103, 37.1, 2 C; 95/11 L

[56] References Cited
UNITED STATES PATENTS

| 3,267,272 | 8/1966 | Fischer | 240/1.3 |
| 3,430,545 | 3/1969 | Wick | 240/1.3 X |
| 3,438,315 | 4/1969 | Goshima et al. | 240/1.3 X |
| 3,458,270 | 7/1969 | Ganser et al. | 240/1.3 X |
| 3,454,756 | 7/1969 | Iwata et al. | 240/1.3 |
| 3,473,880 | 10/1969 | Wick | 240/1.3 |
| 3,500,732 | 3/1970 | Nijland et al. | 240/1.3 |

*Primary Examiner* — John M. Horan
*Assistant Examiner* — Alan Mathews
*Attorneys* — Richard H. Burgess, Henry P. Truesdell, Frank L. Neuhauser, Oscar B. Waddell, James J. Hazna and Joseph B. Forman ABSTRACT: A multilamp photoflash array with lamp reflector units in linear rows facing in opposite directions with the reflectors of each row nested into the reflectors of the opposite row. Insulation means between rows of reflectors and convection cooling means minimize distortion of adjacent reflectors on flashing of lamps.

PATENTED AUG 10 1971
3,598,984
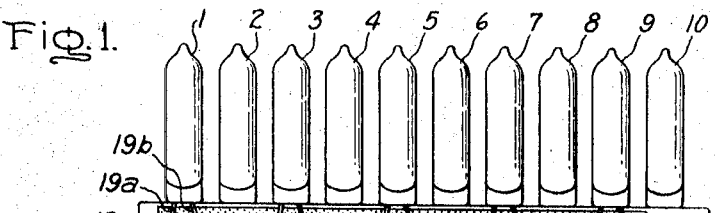
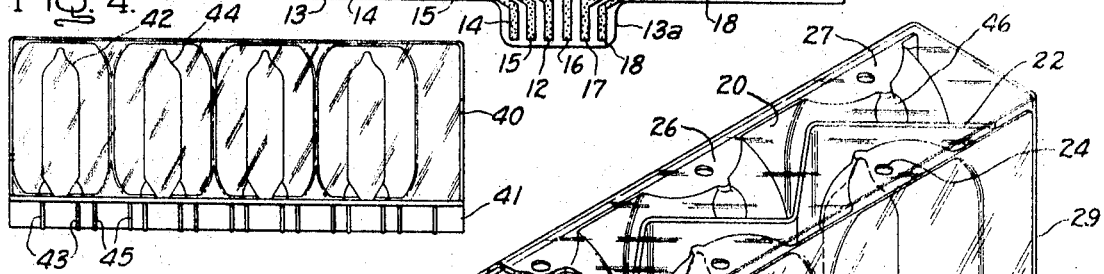
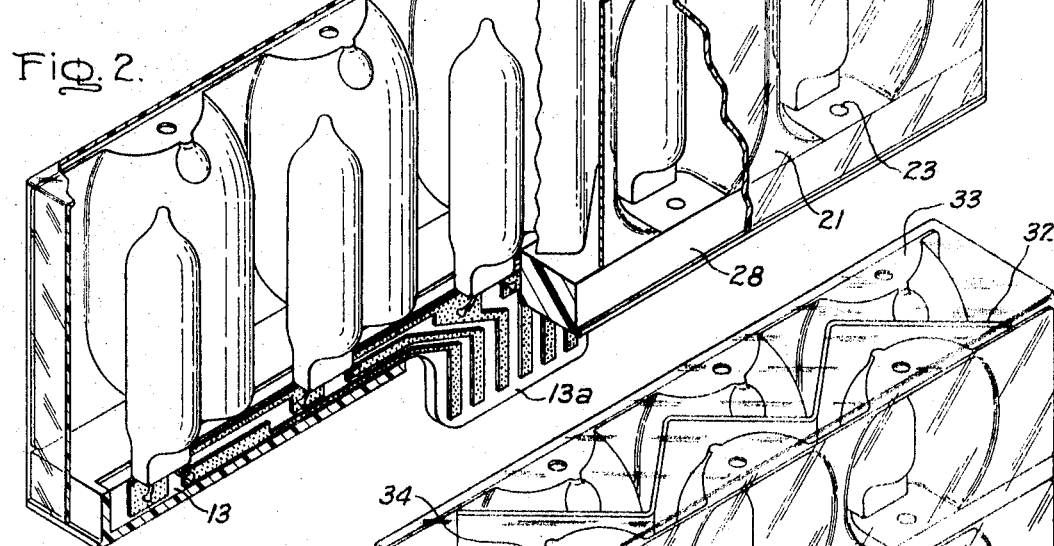
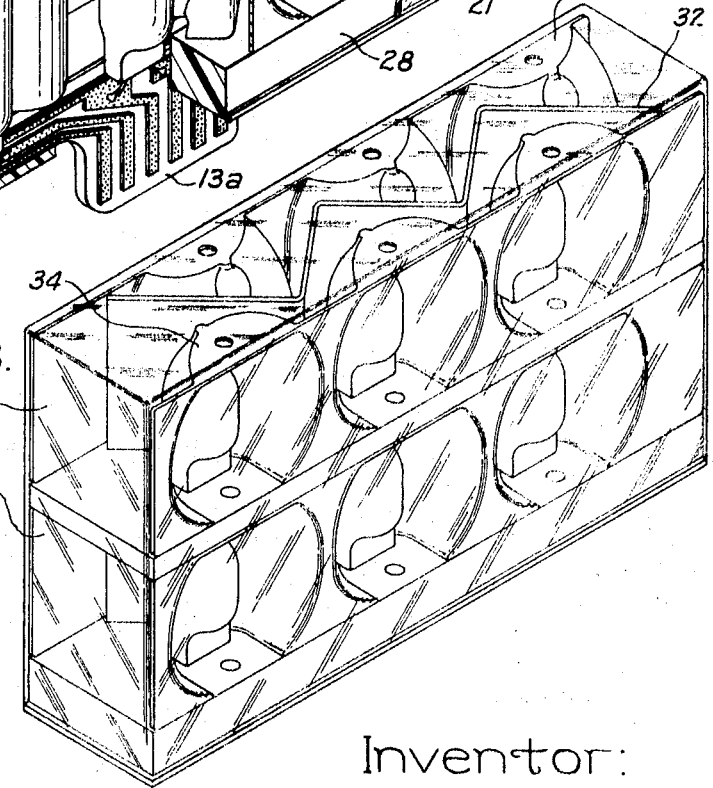
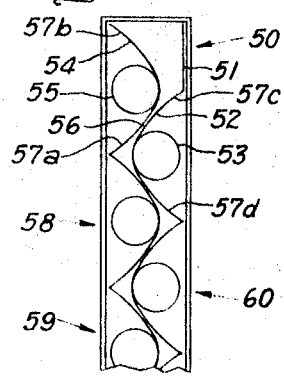
Inventor:
Stanley L. Slomski
by Richard H. Burgess
His Attorney

PHOTOFLASH LAMP ARRAY

CROSS-REFERENCES TO RELATED APPLICATIONS

Preferred electrical connection means for use in photoflash lamp arrays of the present invention are disclosed and claimed in copending application Ser. No. 784,075, filed concurrently herewith in the names of John D. Harnden, Jr., and William P. Kornrumpf for "Construction of Disposable Photoflash Lamp Array." Preferred reflectors for use with the present invention are disclosed and claimed in copending application Ser. No. 784,066, filed concurrently herewith in the name of Donald R. Schindler for "Photoflash Lamp Array with Reflector-Lamp Module."

Both of the above-identified applications are assigned to the assignee of the present invention.

BACKGROUND OF THE INVENTION

The invention relates to multiple photoflash lamp devices. More particularly, it relates to such devices in which there is a separate reflector associated with each photoflash lamp.

In the prior art, four all-glass photoflash lamps generally of the type disclosed and claimed in U.S. Pat. No. 2,982,119 in the name of Robert M. Anderson, granted May 2, 1961 and assigned to the assignee of the present invention, are used in a rotary multiflash device known as a flashcube. In the flashcube, individual reflectors are positioned behind each lamp, and the reflectors open out on four faces of a cube so that by rotating about a central axis each of these four faces of the cube can be pointed, one at a time, in the same direction, namely, at the object being photographed.

The literature also discloses other multiple photoflash devices wherein each lamp has a reflector associated with it. These include devices wherein all the reflectors are folded from a common piece of reflecting material, and devices in which the material is formed as a corrugated sheet and the opposing corrugated faces of the same piece of material are used as reflectors for separate lamps.

However, none of these examples of the prior art provides an ideally suited multiple photoflash lamp array wherein optimum lamp reflector optics can be obtained and maintained, particularly for subsequent lamps after flashing of preceding lamps, in combination with a linear form wherein it is not necessary to rotate the array during switching between lamps and wherein the number of lamps and the amount of light available are maximized from a package which is as small as possible.

SUMMARY OF THE INVENTION

Thus, it is an object of the present invention to provide a multiple photoflash lamp array which does not need to be rotated between successive flashings and in which superior optics and handling convenience are incorporated.

Another object of the invention is to provide such an array in which the flashing of one lamp does not depreciate the optical performance of adjacent lamp reflector units.

A further object of the invention is to provide such arrays in which optical performance and convenience to the consumer in terms of small size combined with maximum light output and numbers of flashes are maximized.

Briefly stated, the present invention in certain of its embodiments provides a multiple photoflash lamp array comprising a base member, electrical connection means, and a plurality of lamp-reflector units, each of said units comprising a photoflash lamp mounted on said base member and a reflector within which each of said lamps is disposed. The electrical connection means are adapted to permit selective connection of the lamps to a flash-initiating means. The array comprises a first group of a plurality of such units mounted on the base so as to project their light output in a first direction and a similar second group mounted on the base so as to project the light in substantially the opposite direction. The first and second groups have their lamps staggered, preferably in parallel rows and have separate reflectors nested in back-to-back relation. Alternate lamp-reflector units along a common base face in opposite directions. Preferably, each of said groups has its reflectors formed in a single piece of material, and the multiple reflectors for each of said groups are inserted in nested relation between the staggered rows of lamps.

In one preferred form, substantially tubular lamps are used with their longitudinal axes substantially perpendicular to the base member. The reflectors can have various shapes, but preferably have shapes similar to or with small variations from parabolic cross sections.

In certain preferred embodiments, the array has insulation means between the rows of reflectors to minimize distortion of adjacent reflectors upon flashing of the lamp. The insulation means can comprise a sheet of suitable material such as asbestos, or it can comprise a thermal barrier such as an airspace. Alternatively, the two rows of reflectors can be formed on opposite sides of a monolithic plastic injection molding of sufficient thickness to avoid such distortion. Distortion can also be minimized by providing means such as holes at the top and bottom of each unit of the array or between the rows of reflectors for the vertical flow of convection currents of air to cool the reflectors upon flashing.

Various connection means can be used with photoflash lamp arrays of the invention including a contact board having electrical contact strips on at least one of its surfaces, or as an alternative, separate double electrical contacts for each of the lamps. Preferably one of the contact strips is common to all of the photoflash lamps, and a second contact is made from each of the lamps separately on the contact board.

BRIEF DESCRIPTION OF THE DRAWINGS

FIG. 1 is a front view of a disassembled lamp array of the invention without reflector or base showing two groups of lamps and their connections on one preferred type of contact board.

FIG. 2 is a schematic view partly in section of an assembled photoflash lamp array of the invention.

FIG. 3 is a perspective view of an alternative embodiment of a photoflash lamp array of the invention.

FIG. 4 is a front view of another alternative form of photoflash lamp array of the invention having a different type of electrical connection means.

FIG. 5 is a schematic horizontal cross section of part of a photoflash lamp array of the invention showing the nesting of the two rows of reflectors and the placement of the lamps therein.

DESCRIPTION OF THE PREFERRED EMBODIMENTS

The present invention provides a new family of multiple photoflash lamp arrays which greatly increase the convenience to the user in terms of numbers of flashes available in a very small package. The configurations of such arrays make possible instantaneous switching from one lamp to the next by electronic means or very rapid switching by other means. In conjunction with certain specific types of electrical contact means described and claimed in further detail in the above-identified application of Harnden and Kornrumpf, arrays of the present invention can be quite readily plugged into a flashing unit without the necessity of making multiple individual electrical connections, and then a number of lamps such as five can be flashed rapidly without attention by the photographer. Then, the array can be very easily turned around back to front and another series of a like number of lamps can then be utilized with similar ease. When desirable, more than one lamp can be flashed at the same time or while the camera shutter is still open to increase the light available on the subject being photographed.

Turning now to the drawings, FIG. 1 shows a group of 10 lamps attached to a contact board in accordance with a preferred embodiment of the invention. The reflectors, base and cover for the assembly are not shown in place in this figure, so that the staggered lamps all appear consecutively. Lamps 1, 3, 5, 7 and 9 in practice have reflectors behind them to project their light in a forward direction. Lamps 2, 4, 6, 8 and 10 have reflectors arranged to project their light in the opposite direction. It can be seen readily that common contact 12 is made on printed circuit contact board 13 from one inlead wire such as 19a of each of the lamps on the front side of the array. Separate contacts 14, 15, 16, 17 and 18 are made from the other inlead such as 19b of each of the lamps facing in the forward direction. These contacts are all lead into adjacent positions on contact tab 13a which can be made relatively narrow compared to the array and which readily plugs into a suitable receiving socket on the flash device or on the camera itself. Spring contacts to each of the conductive strips printed on contact tab 13a are made in the socket. The reverse side of contact board 13 has an equivalent printed circuit and equivalent contacts for the lamps facing in the rearward direction.

FIG. 2 is a schematic view partly in section of an assembled lamp array constituting one of the preferred embodiments of the invention. Reflectors for each of the lamps have been inserted in place with the reflectors for the rearward facing group all formed from one sheet of material 20 such as aluminized plastic. Forward facing reflectors are formed from one sheet of similar material 21.

Preferably, a sheet of insulating material 22 such as asbestos paper or other heat-resistant material is placed in a zigzag fashion between the nested backs of the reflectors of groups 20 and 21. An airgap or other thermal barrier could serve a function similar to that of the asbestos sheet. Also, vent means are provided such as the openings 23 and 24 in the bottom and top walls of each lamp chamber to carry air convection currents past each lamp 25 when it is flashed to cool it and its reflector. The vent means could be provided in the space between the two reflector rows 20 and 21. The effect of both the insulating means 22 and the vents 23 and 24 is to minimize or essentially prevent distortion of adjacent reflectors in the same row or in the opposite row upon the flashing of one lamp. If insufficient precaution is taken, on the flashing of a lamp such as lamp 25, the adjacent reflectors 26 and 27 in the rearward facing group could be distorted so as to severely depreciate their optical performance. Utilizing both sides of a single thin corrugated sheet of material as reflectors would maximize distortion difficulties, unless expensive, thick sheet material were used. Even then, preferred optics cannot readily be obtained using both sides of a single sheet of material with such simple shapes as sine waves.

As shown in FIG. 5, lamp-reflector units of one group are nested into and fit between those of the other group. Lamp 53 and its reflector 52 are nested between lamp 55 in its reflector 54 and the next lamp-reflector unit 58 in that group. Similarly, unit 60 is nested and spaced about halfway between units 58 and 59. Some space or, optionally, insulating material, is preferably left between the two rows of reflectors as shown at 56 to prevent distortion of adjacent reflectors on flashing.

The reflector units on the two sides of the array do not utilize both sides of a common sheet of material, but rather each reflector unit has its own wings, 57a and 57b for reflector 54 and 57c and 57d for reflector 52. This permits much better control of light than would a simple single reversing curve such as a sine wave, and it permits the use of lamps of a size which reaches from the bottom or innermost region of each reflector unit almost out to the transparent cover 50, with good light control which is not possible with a sine wave reflector. This also maximizes the packing factor or packing density of lamp-reflector units per unit volume for optimum desired light output.

As illustrated, flat portion 51 of the right-hand group of reflectors completes the metallized plastic sheet from which the right-side multiple reflector is pressed. A similar flat portion is used on the other end, not shown, of the left-side reflector sheet.

Although the preferred reflectors are shown with a smooth, continuous curvature, and certain preferred reflector contours are disclosed in the above-identified application of Schindler, the present invention does not require particular curvatures for the reflectors. Reflectors with flat sides, flat bottoms or innermost regions perpendicular to the direction of light output, or flat segments approximating preferred curvatures are also within the scope of this invention as long as they embody separate nested reflector groups. This permits the use of reflectors having wings like 57a, b, c and d with lamps that approximately fill the full depth of the reflector for optimum optics and maximum controlled light output in a package of minimum size.

The preferred reflectors shown in FIGS. 2 and 3 are not just vertically cylindrical, parabolic surfaces, but also have curvatures around each end of the lamps. In fact, in the form of the invention shown in FIG. 3 which uses short lamps, the reflectors approximate truncated surfaces of revolution.

In addition to reflectors, preferably formed together for each group as at 20 and 21 in FIG. 2, and the lamps as at 25 and the contact board 13 with its tab 13a, the array also comprises a base member 28 and a light-transmitting protective cover 29. Base 28 can be formed in one or more pieces and has suitable recesses and holding means provided in it to hold upright the contact bar 13, the contact tab 13a and the lamps as at 25, while providing a platform to hold reflectors 20 and 21 and cover 29. Locating indentations 46 formed in the top region of each individual lamp reflector such as 52 or 54 can aid in holding the lamps upright. Suitable means known in the art may be used to seal together the various components of the array. Suitably tight fitting of the reflectors to the housing, or fastening the two together such as by gluing or ultrasonic bonding, can aid in preventing any volatile products of the flashing of one lamp from spreading into adjacent lamp-reflector units, especially on the same side of the array.

Alternatively, instead of separate sheet-type reflectors 20, 21 for each group and insulating material 22, the reflectors may be provided in monolithic form such as by injection molding one piece of material such as plastic to produce all the reflectors at once. Providing that the thickness and thermal stability of the monolithic injection molded material is sufficient, the monolithic form itself would provide insulating means to minimize or prevent distortion of adjacent reflectors. The reflecting surfaces are preferably metallized such as with aluminum. Alternatively, high-reflectance white plastic surfaces could be used, and either specular or matte finishes can be suitable for various purposes.

Photoflash lamp arrays of the invention can be made so as to permit the flashing of more than one lamp at a time or while the camera shutter is still open to give extra light on the scene being photographed.

FIG. 3 illustrates another embodiment of the invention in the form of two rows 30 and 31 of shorter stacked lamp-reflector units facing in each of the two directions, forward and rearward. As shown, insulating material 32 such as asbestos paper is provided between the reflectors for forward and rearward facing groups 33 and 34. Preferably the upper and lower groups 30 and 31 respectively are staggered as illustrated to facilitate making electrical contacts from the upper lamps to a suitable contact means at the bottom of the array. Alternatively, upper row 30 could also be staggered relative to lower row 31 so that the electrical contact means for the lamps of upper row 30 could more easily pass between the lamp-reflector units of lower row 31.

FIG. 4 illustrates another embodiment of the invention showing four lamp-reflector units on one side of an array. A like number of lamp-reflector units is provided at the rear of the array with the lamps staggered and the reflectors nested into those of the front units 40 as described above in connection with other figures. This embodiment of the invention differs from the other described in the contact means which are here provided on a contact bar 41 with two separate wire contacts for each lamp. Contacts for lamp 42 on the front side 40 of the array are shown at 43. Contacts for the lamp on the rear side of the array which is between lamps 42 and 44 are shown at 45.

As will be appreciated, the present invention largely concerns the optical aspects of a multiple photoflash lamp array with various contact means including those specifically described as well as others which could be used with the invention.

What I claim as new and desire to secure by Letters Patent of the United States is:

1. A photoflash lamp array comprising: a base member; electrical connection means; and a plurality of lamp-reflector units, each of said units comprising a photoflash lamp mounted on said base member and a reflector within which each of said lamps is disposed; said electrical connection means for selectively connecting said lamps to flash-initiating means; said array comprising a first group of a plurality of said lamp-reflector units mounted in a row on said base with their reflectors facing in a first direction, and a second group of a plurality of said lamp-reflector units mounted in a row on said base with their reflectors facing in substantially the opposite direction from that of said first group of reflectors; the lamps of each group of lamp-reflector units in said array being staggered relative to the lamps of the other group, and all the reflectors of each group of lamp-reflector units being constituted of a single piece of material with the reflectors of said first group nested in back-to-back relation with the reflectors of said second group.

2. A photoflash lamp array according to claim 1 in which said lamps are substantially tubular and have their longitudinal axes substantially perpendicular to said base member.

3. A photoflash lamp array according to claim 1 in which insulation means are provided between the reflectors of said first group and the reflectors of said second group whereby distortion of adjacent reflectors upon the flashing of a lamp in one of said units is minimized.

4. A photoflash lamp array according to claim 1 in which means are provided for the vertical flow of convection currents of air to cool the reflectors upon flashing of the lamps so as to minimize distortion of adjacent reflectors upon flashing of a lamp in one of said units.

5. A photoflash lamp array according to claim 1 in which said electrical connection means comprise a contact board having electrical contact strips on at least one of its surfaces.

6. A photoflash lamp array according to claim 5 in which said contact board has on one side a common contact connected to one lead of each of the lamps of said first group and also has on said first side a separate lead for each of said lamps of said first group, and the reverse side of said contact board has a like arrangement for each of the lamps of said second group.

7. A photoflash lamp array according to claim 1 in which said electrical connection means comprises two electrical contacts for each of said lamps.

8. A photoflash lamp array according to claim 1 in which a plurality of the said nested groups of lamp-reflector units are arranged in a plurality of layers located one on top another.

9. A photoflash lamp array according to claim 1 in which:
insulation means are provided between the reflectors of said first group and the reflectors of said second group whereby distortion of adjacent reflectors upon the flashing of a lamp in one of said units is minimized, and
said electrical connection means comprise a contact board having electrical contact strips on each side comprising a common contact connected to one lead of each of the lamps of said first group and also has on the same side a separate lead for each of said lamps of said first group, and the reverse side of said contact board has a like arrangement for each of the lamps of said second group.

10. A photoflash lamp array according to claim 1 in which a protective light-transmitting cover is provided over the said nested groups of lamp-reflector units.